United States Patent
Pazdersky et al.

(10) Patent No.: US 6,546,239 B1
(45) Date of Patent: Apr. 8, 2003

(54) MOBILE RADIO TELEPHONE WITH REDUCED KEY SET

(75) Inventors: Kristian Pazdersky, Taufkirchen (DE); Klaus Harisch, Altenstadt (DE); Peter Wunsch, Gauting (DE)

(73) Assignee: Easyphone GmbH, Unterhaching (DE)

(*) Notice: Subject to any disclaimer, the term of this patent is extended or adjusted under 35 U.S.C. 154(b) by 0 days.

(21) Appl. No.: 09/423,235
(22) PCT Filed: Apr. 30, 1998
(86) PCT No.: PCT/EP98/02566
§ 371 (c)(1),
(2), (4) Date: Nov. 2, 1999
(87) PCT Pub. No.: WO98/51059
PCT Pub. Date: Nov. 12, 1998

(30) Foreign Application Priority Data

May 2, 1997 (DE) .......................................... 197 18 711

(51) Int. Cl.⁷ ................................................ H04M 1/66
(52) U.S. Cl. ....................... 455/410; 455/411; 455/564; 379/88.03; 379/355.02
(58) Field of Search ................................. 455/403, 410, 455/411, 412, 418, 419, 420, 422, 460, 563, 564, 572, 573, 575, 79, 186.1, 90; 379/88.01, 88.02, 88.03, 88.04, 355.01, 355.06; 381/110; 704/246

(56) References Cited

U.S. PATENT DOCUMENTS

| | | | | |
|---|---|---|---|---|
| 5,042,063 A | * | 8/1991 | Sakanishi et al. | 455/563 |
| 5,068,889 A | * | 11/1991 | Yamashita | 455/411 |
| 5,305,372 A | * | 4/1994 | Tomiyori | 455/564 |
| 5,734,964 A | * | 3/1998 | Fishman et al. | 455/186.1 |
| 5,754,954 A | * | 5/1998 | Cannon et al. | 455/419 |
| 5,758,286 A | * | 5/1998 | Leppanen | 455/403 |
| 5,812,946 A | * | 9/1998 | Nakabayashi et al. | 455/418 |
| 5,875,405 A | * | 2/1999 | Honda | 455/564 |

* cited by examiner

*Primary Examiner*—Quochien Vuong
(74) *Attorney, Agent, or Firm*—Scully, Scott, Murphy & Presser

(57) ABSTRACT

The invention provides the possibility of reducing the size of a mobile phone (1) by reducing the key set (7, 11, 12, 13).

Figure 1A:
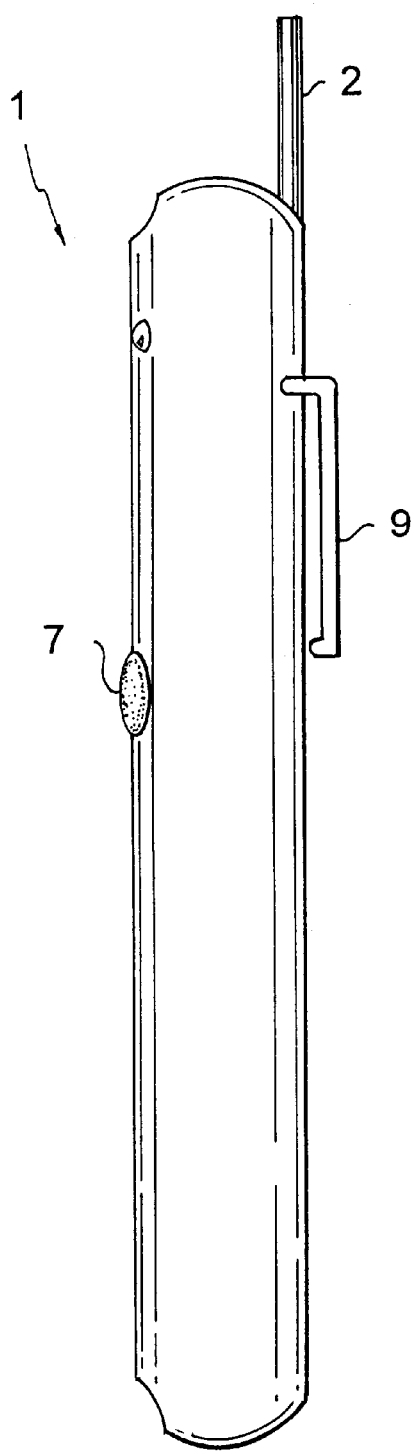

The invention provides a system and a method for mobile radio transmission by means of a mobile unit (1) which, for setting up a connection, has only one or more direct connection keys (7, 11, 12, 13), the initial activation of which in each case sets up a connection to a destination location assigned to one of the respective direct connection keys (7, 11, 12, 13). By activation of a central key (7) of the mobile unit (1), a connection (33) from the mobile unit (1) to a central switching device (30) is set up.

13 Claims, 4 Drawing Sheets

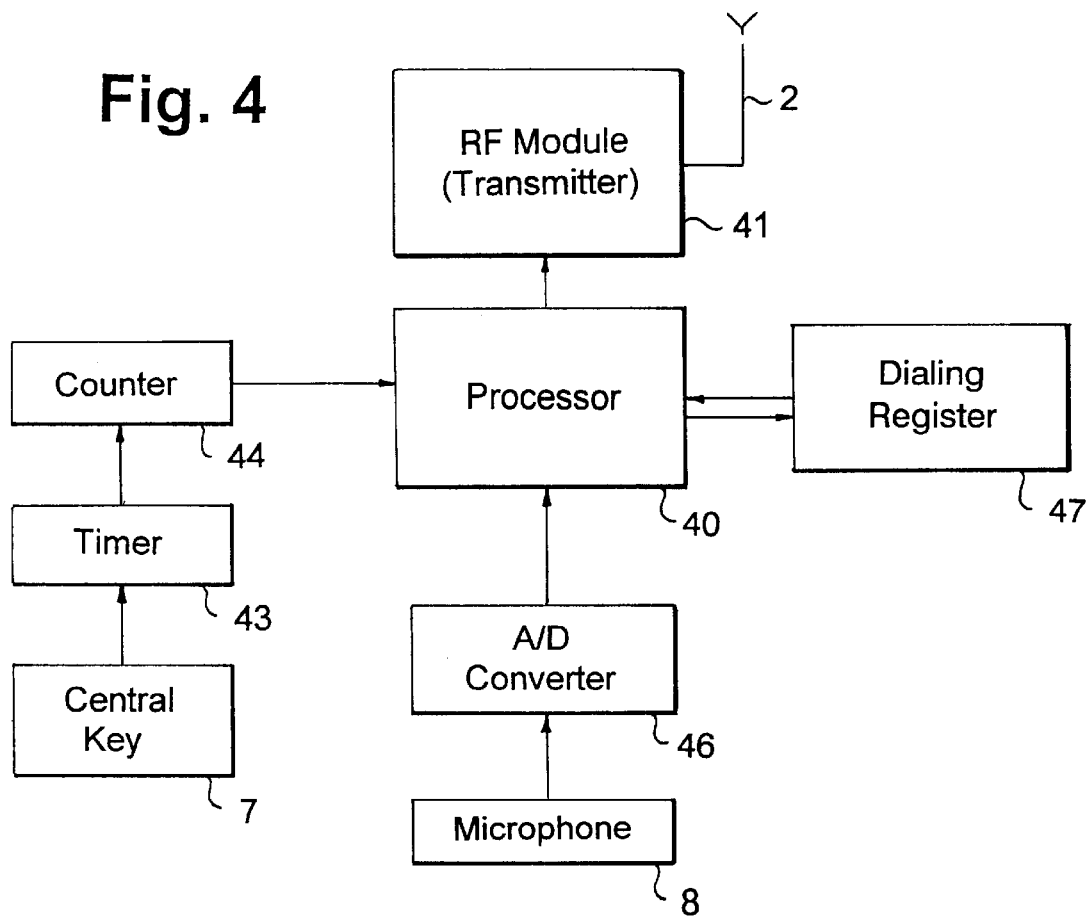
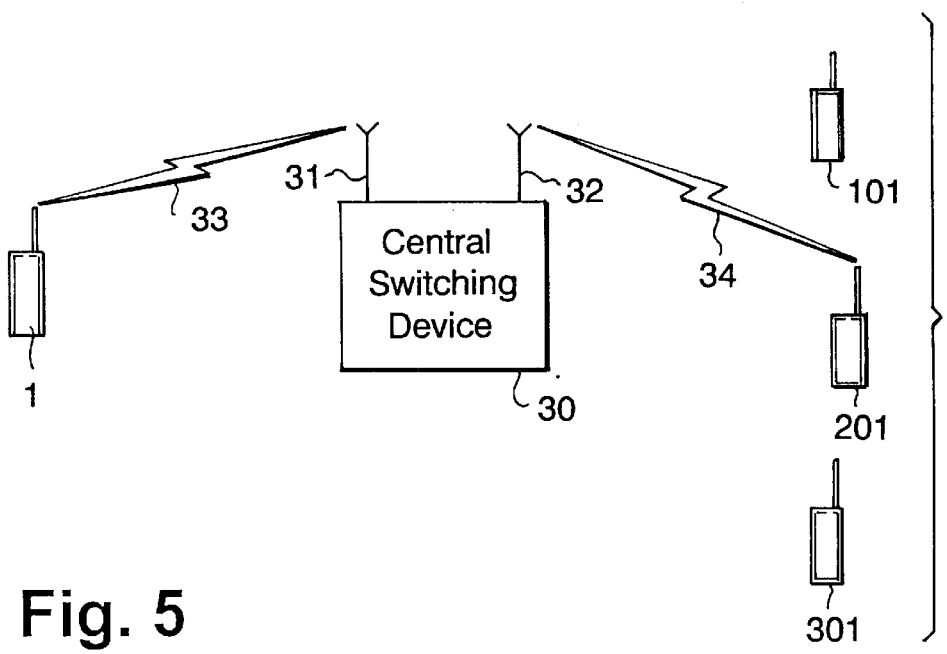

MOBILE RADIO TELEPHONE WITH REDUCED KEY SET

The present invention relates to a method and a system for mobile radio transmission by means of a mobile unit.

In mobile radio telephones (mobile phones) the size and the weight of the mobile phone is a decisive factor for the user. This means that if a mobile phone is smaller and lighter in weight, it can be carried more conveniently by the user and be available at all times. Meanwhile, the process of reducing the size of conventional mobile phones has reached a limit which it seems virtually impossible to overcome. The length of a mobile phone in the operational state is defined by the distance between the user's mouth and one of his ears. For this reason, when the mobile phone is in the state in which it is not ready to be spoken into its length can be reduced further by, for example, folding it up.

Therefore, it has become apparent that the keypad is a decisive factor, in particular for the width dimension of a mobile phone. Usually, a mobile phone has the ten immediately required dialling keys together with a number of further keys for additional functions so that as a rule approximately 20 keys are arranged on a keypad on the upper side of a mobile phone. Technically it is possible to implement an overall further reduction in size of the keys of the keypad in order to reduce the size of the mobile phone, but there are natural limits to the reduction in size in that it must be possible for a finger of a hand of an adult to be able to activate a key reliably and clearly. This means that the distance between two keys must be at least such that when a key is activated an adjacent key is not undesirably activated also under circumstances. Even if, in order to reduce the size of the keypad, most additional function keys are omitted, at least the ten keys which are necessary for dialling a number together with an on/off switch are left. There is also the problem that in particular the reduction of the width of conventional mobile phones has reached a limit.

The object of the present invention is therefore to design a mobile radio transmission system in such a way that a particularly compact design of the associated mobile phone is made possible.

The invention is based on the idea that the key set can be severely reduced and the operational capability of the mobile phone is nevertheless completely ensured if access to specific functions of the mobile unit are exported, for example, into an intelligent switching service.

The invention therefore provides a method for configuring a mobile unit, the mobile unit having one or more dialling keys. All of the dialling keys are each assigned one connection destination. By activating a dialling key it is thus possible to connect exclusively to the assigned connection destination. The assignment to a central key is made here in such a way that the user of the mobile unit cannot change it directly by accessing the mobile unit.

This means that according to the invention the mobile unit does not have any keys which serve in the conventional sense for exclusively inputting a digit but rather that the mobile unit has only connection set-up keys which permit a connection set-up to a pre-programmed connection destination by means of a single activation (direct dialling keys). Be activating a central key of the mobile unit a connection is set up from the mobile unit to a central switching device, for example.

A password table which contains subscriber data with a respectively assigned password can be stored in the central switching device. After the set-up of the connection from the mobile unit to the central switching device, subscriber data and a password are then transferred from the mobile unit to the central switching device. The central switching device then compares the transferred subscriber data and/or the transferred password with the data stored in the password table. In the event that this comparison results in a correspondence between the transferred subscriber data and the transferred password with the corresponding data in the password table, the central switching device then forwards the connection of the user of the mobile unit as desired. Since, according to the invention, it is not necessary to key in a code to activate the mobile unit, the user's security, for example in the event of a theft or other loss of the mobile unit, is ensured by the password which is to be transferred to the central switching device.

The assignment of a connection destination to in each case one of the connection set-up keys, with the exception of the central key, can be carried out here by means of a data transfer from the central switching centre to the mobile unit. It should be noted here that owing to the reduced key set, i.e. owing to the fact that only the aforesaid direct dialling keys are provided on the mobile unit, programming (assignment) of a connection destination to one of the connection set-up keys cannot be carried out at the mobile unit by the user himself.

As an alternative, or in addition, for the assignment of a connection destination to in each case one of the connection set-up keys, with the exception of the central key, the mobile unit can be inserted into a base station, the assignment then being carried out by means of a data transmission from the base station to the mobile station.

The base station can simultaneously serve as a charger station. This means that when the mobile unit is inserted into the base station an accumulator in the mobile unit can be charged at the same time.

In the password table of the central switching device, a list of preferred connection destinations can be assigned in each case to a password and/or to respective specific subscriber data. The function of a personal telephone directory is thus made possible.

A particularly simple method of operation is obtained if the activation of the central key firstly switches on the mobile unit, a further activation of the central key then sets up the connection to the central switching device, yet another activation of the central key releases the connection to the central switching device and a further activation of the central key then switches the mobile unit off again.

The mobile unit can preferably have a key lock, preventing the mobile unit from being switched on unintentionally. The key lock can bow overcome, for example, by a combination of a plurality of keys or by pressing a key for a predefined period of time.

One of the connection set-up keys can be assigned an emergency-call connection destination. By pressing once on this emergency-call key, a connection can thus easily be set up to an emergency-call organization, which is advantageous in particular for people for whom it is not possible to compose a complete number using conventional dialling keys because of physical and/or mental disabilities.

According to a further aspect of the invention, a mobile radio transmission system is provided with at least one mobile unit and one central switching centre. For performing connection set-ups, the mobile unit here has merely one or more keys, which, by being activated once, can set up a connection, in the manner of a direct dialling operation, to a connection destination which is assigned to the respective key. A central key to which a central switching device is assigned as a permanently pre-programmed connection destination is provided here. Permanently pre-programmed is intended to mean here that it is not possible, at least for the user of the mobile unit, to assign to the central key any connection destination other than the central switching device.

The central switching device can have a password table which contains subscriber data with a respectively assigned password. It is possible to provide a device by means of which, after the set-up of the connection from the mobile unit to the central switching device, subscriber data and a password can be transferred to the central switching device. A device for comparing the transferred subscriber data and/or the transferred password with the password table is then provided in the central switching device.

In the event that the call transfer by the central switching device does not take place, because, for example, the desired subscriber is currently engaged, a redial function may be provided in the mobile unit, for example by means of the central key, so that by simply activating the central key again without cooperation a renewed dialling attempt can be carried out.

In the central switching device, it is also possible to provide a device for assigning a connection destination to in each case one of the connection set-up keys, with the exception of the central key, the assignment being effected by means of a data transfer from the central switching centre to the mobile unit.

The mobile radio transmission system can be provided with a base station into which the mobile unit can be inserted in order to carry out an assignment (programming) of in each case one connection destination to one of the connection set-up keys, with the exception of the central key, by means of a data transfer from the fixed station to the mobile unit.

The base station can simultaneously be a charger station which, when the mobile unit is in the inserted state, charges an accumulator in said mobile unit. The base station can have all the functions of a conventional telephone and in particular a hands-free talking facility.

A list of preferred connection destinations, which is assigned to a password and/or to specific subscriber data, may be provided in the password table of the central switching device.

Figure 1B:
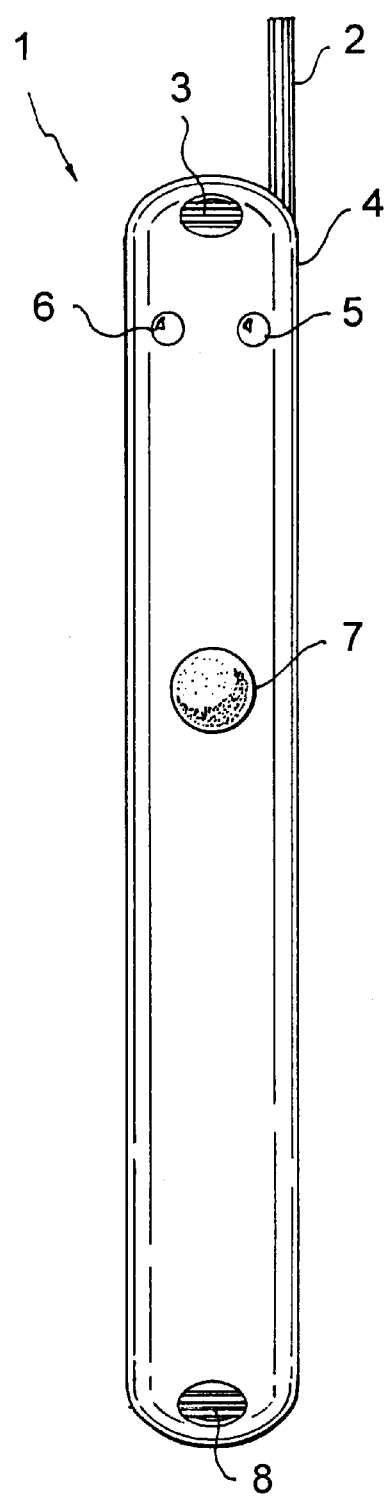
Figure 2A:
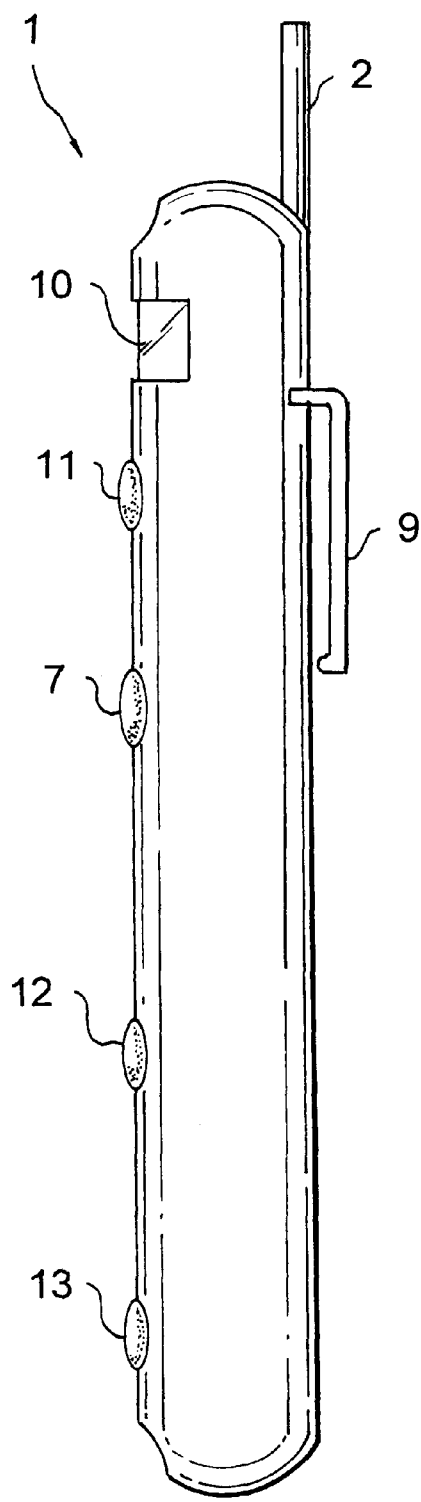
Figure 2B:
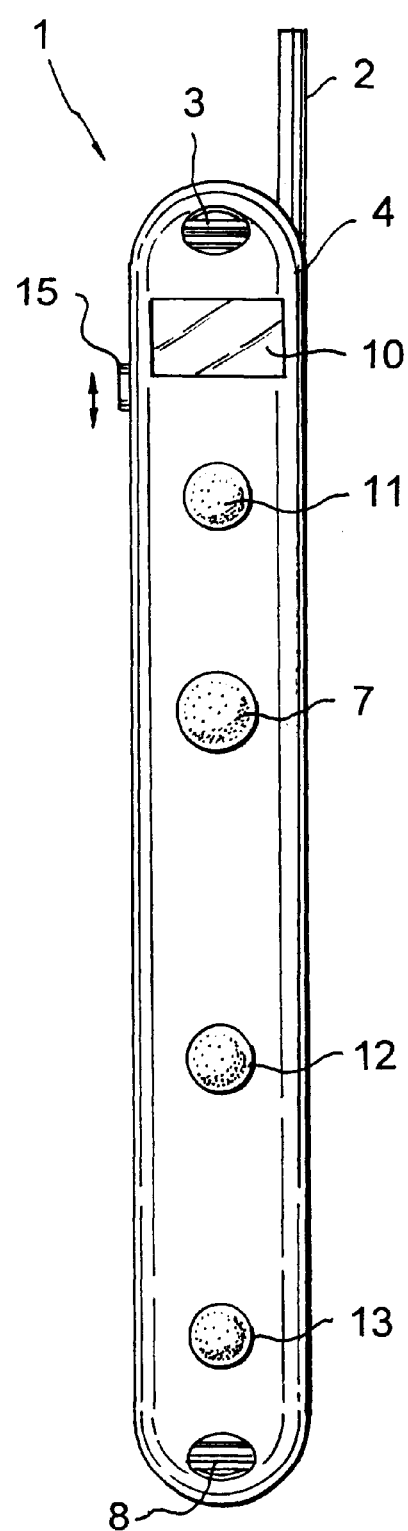
Figure 3:
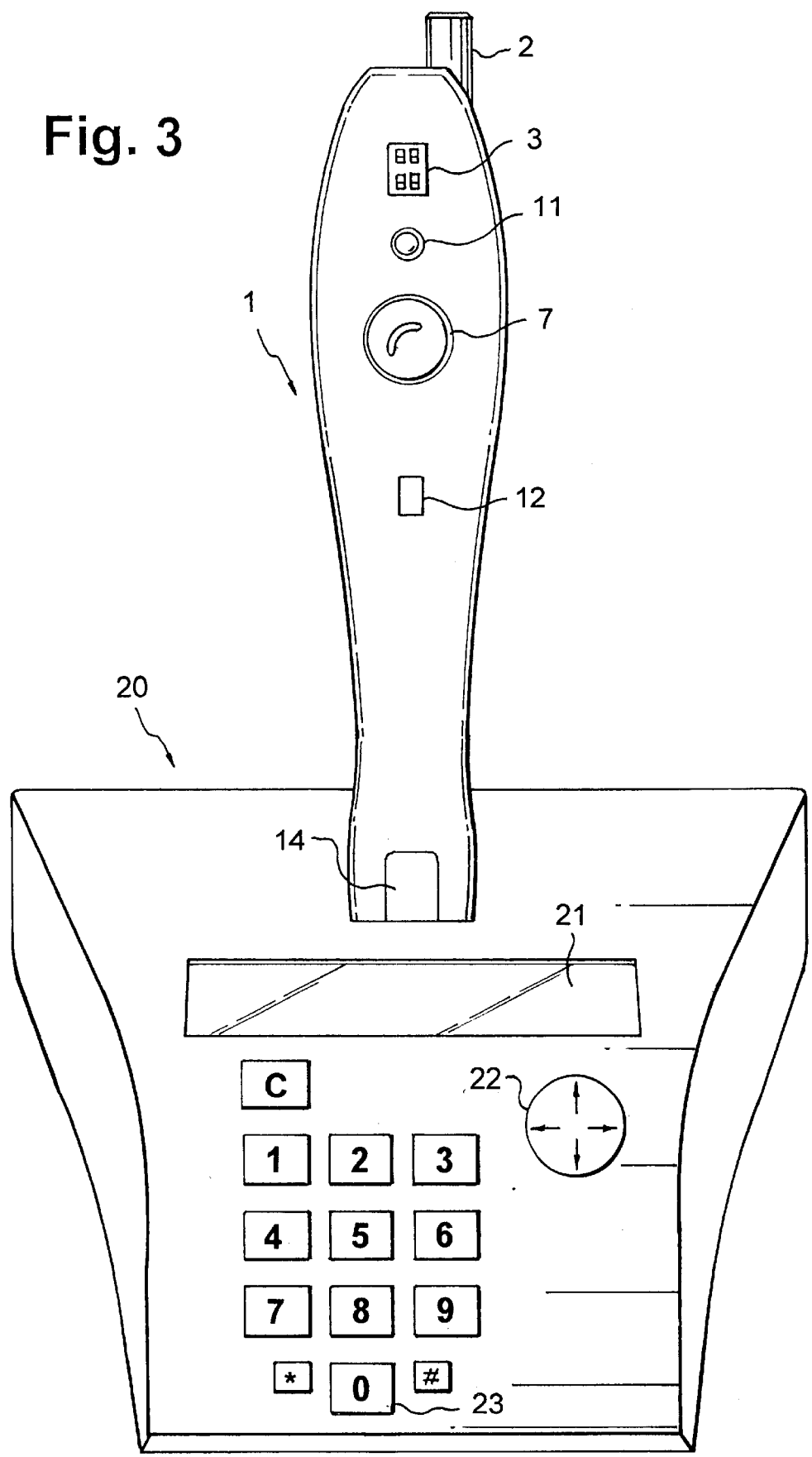

The invention will now be explained in more detail by means of exemplary embodiments and with reference to the accompanying drawings, in which:

FIGS. 1a and 1b show a first exemplary embodiment of a mobile unit as is used in the present invention in accordance with a first exemplary embodiment, FIGS. 2a and 2b show a further mobile unit, as is used in the present invention in accordance with a further exemplary embodiment, FIG. 3 shows a mobile unit in the state in which it is inserted into a base station in accordance with the invention, FIG. 4 shows an internal design of a mobile unit in accordance with the present invention, and FIG. 5 shows a schematic view of a system according to the invention for mobile radio transmission.

FIGS. 1a and 1b show a mobile unit 1 as is used in the present invention. The mobile unit 1 has here an antenna 2, a casing 4, a loudspeaker 3 and a microphone 8. The distance between the loudspeaker 3 and the microphone 8 corresponds essentially to the distance between the mouth of an adult and one of his ears. The length of the mobile unit 1 is determined essentially by the distance between the loudspeaker 3 and the microphone 8. The width of the mobile unit 1 which is illustrated in FIGS. 1a and 1b is, for example, 2 to 3 cm. This small width of the mobile unit 1 is, as is clear, made possible by the fact that a conventional keypad comprising a plurality of keys, each for inputting one digit, is not provided on the surface of the mobile unit 1, i.e. on the casing 4 of the mobile unit 1. The mobile unit 1 according to the exemplary embodiment illustrated in FIG. 1 has just one key, namely a central key 7. If this central key 7 is pressed once, the mobile unit 1 is switched on. Directly after operation, after successful authorization checking of the inserted SIM card there is immediately the search for an accessible mobile radio network. The flashing of a network diode 5 shows here that the search process is being carried out. When the network diode 5 lights up uninterruptedly this indicates that a network connection has been successfully found. After this process of searching for and signing onto a mobile radio network, the mobile unit 1 is then in a state in which it can be dialled up in the same way as a conventional mobile phone. It is not necessary to input a so-called PIN code manually in order to activate the mobile unit 1 because, as stated above, internal checking of the authorization is carried out automatically.

The network diode 5 can also have the function that a change in the colour of its light, for example from green to red, indicates the status in which a connection has been set up.

The mobile unit 1 also has a volume controller for the loudspeaker 3, which is however not illustrated.

In the switched-on state of the mobile unit 1, calls can thus be received. These calls may be signalled audibly, visually or by vibration. In the exemplary embodiment illustrated in FIGS. 1a and 1b, a call is represented by means of an LED 5. This call LED 5 flashes when a call is received, and lights up continuously while a call is being made. By pressing the central key 7 it is possible to terminate again an ongoing call. When the call is terminated, the call LED 5 thus goes out.

An explanation of how outgoing calls can be made from the mobile unit 1 will now be given below. The condition for this is firstly that the mobile unit 1 has been switched on and the network LED 6 is lit up, that is to say there is a connection to a mobile radio network. By pressing the central key 7 once more, a connection can then be set up to a connection destination, the predefined connection destination being permanently programmed into the mobile unit 1, for example by the network operator, the manufacturer of the mobile phone unit or the operator of the connection destination. "Permanently programmed" means in the terms of the present invention that simply by accessing the mobile phone unit 1 it is not possible to change or delete the predefined connection destination which is assigned to the central key 7 by permanent pre-programming. The programming of the connection destination which is assigned to the central key 7 is therefore not carried out by the user of the mobile unit 1 but is instead provided on a one-off basis by the manufacturer before the mobile unit 1 is sold. A possible predefined connection destination which is assigned to the central key 7 by pre-programming would be, in particular but not necessarily, a central switching device. The precise operation of the central switching device is described below. Pressing the central key 7 a second time thus sets up a direct connection to the central switching device which can then connect the user of the mobile unit 1 to any desired further subscriber, as is also set out below.

The exemplary embodiment of a mobile unit 1 which is illustrated in FIGS. 1a and 1b is thus dimensioned, by omitting a keypad and replacing the keypad with a single dialling key in the form of the central key 7, in such a way that it can be worn or carried in a desired way, for example by means of a clip 9 or can be hung around the neck on a cord (not illustrated), so that, for example, a fitter can work with both hands and at the same time be instructed online by the mobile unit 1 which is hung around his neck and switched on. For this purpose, it is possible preferably to provide a known earpiece since the fitter cannot of course hold the mobile unit 1 against his ear while working.

A further embodiment of a mobile unit 1 according to the invention will now be explained with reference to FIGS. 2a and 2b. The mobile unit 1 which is illustrated in FIGS. 2a and 2b has all the elements of the mobile unit 1 illustrated in FIGS. 1a and 1b. The mobile unit 1 illustrated in FIGS. 2a and 2b differs essentially from the mobile unit illustrated in FIGS. 1a and 1b in that a plurality of direct connection keys 7, 11, 12, 13 are provided. Furthermore, in the exemplary embodiment in FIGS. 2a and 2b, the on/off switching function for the mobile unit 1 is provided separately from the central key 7, namely in the form of an on/off switch 15. This on/off switch of the mobile unit 1 according to FIGS. 2a and 2b is located on the side of the casing 4 of the mobile unit 1 and can be pushed up or down to switch the mobile phone on and off. In addition, the mobile unit illustrated in FIGS. 2a and 2b has a display panel 10.

The function of the other direct connection keys 11, 12, 13 of the mobile unit 1 in FIGS. 2a and 2b will now be explained. These direct connection keys 11, 12, 13 have in common with the central key 7 the fact that by means of a single activation they can set up a connection to a connection destination which is respectively assigned to them. For example, the key 13 can be assigned, as connection destination, an emergency-call destination, i.e. an emergency-call organization. The keys 11 and 12 can be freely assigned as direct connection keys, for example for frequently desired connections, by the user of the mobile unit 1, as will be described below.

Even though it is not illustrated, the mobile unit 1 in FIG. 2 can also have an interface which permits connection to a known GSM modem.

The keys which can be freely assigned by the user can be assigned as follows. Firstly, the user sets up a connection to the central switching device by activating the central key 7. As soon as he has a connection to the central switching device, the user of the mobile unit 1 transfers information, namely specifying which connection destination is to be assigned to which of the freely assignable keys 11, 12, to the central switching device. The actual assignment (programming) of the freely assignable keys 11, 12 is then not carried out directly on the mobile unit 1 itself but rather, for example, by means of known DTMF instructions from the central switching device to the mobile unit 1 via a radio transmission path. The assignment of the freely assignable keys 11, 12 therefore does not take place in each case locally at a mobile unit 1 but instead occurs as a central facility of the switching device.

Before the actual storage of the transmitted assignment, the data which are transmitted from the central switching device 30 are displayed on the display 10 of the mobile unit 1. The ultimate storage of the assignment takes place only after this, as a result of the user pressing a key, for example one of the dialling keys 7, 11, 12, 13.

Call number memories, which are assigned to individual keys, and memory locations of a telephone directory on the SIM card can be assigned by the central switching device 30. In addition, in response to an appropriate call from the mobile unit 1 to the central switching device 30, the central switching device 30 can transmit to the mobile unit 1 information which defines the type of call tone or call tones which will be heard when the mobile unit 1 is used. Furthermore, other features of the mobile unit 1, such as call lock-out, call divert, deactivation of the greeting text and modification/selection of icons for the memory locations of the call number memories of the direct dialling keys can be brought about in response to a call from the mobile unit 1 to the central switching device 30 by transmitting appropriate information from the central switching device 30 to the mobile unit 1.

A further possible way of programming the freely assignable keys 11, 12 is illustrated in FIG. 3. FIG. 3 illustrates the mobile unit 1 in the state in which it is inserted into a base station 20. In the inserted state it is electrically connected to the base station 20 in such a way that an accumulator 14 which ensures that the mobile unit 1 is supplied with voltage is charged from the base station 20. The base station 20 thus also serves as a charger station for the accumulator 14 of the mobile unit 1. As is clear in FIG. 3, the base station 20 has all the control elements which are customary in a conventional telephone, namely a complete control keypad 23 with at least 10 control keys and a large-format LCD display 21. Furthermore, the base station 20 illustrated in FIG. 3 has a central key 22 which performs the same function as the central key 7 of the mobile unit 1 which is explained above when the mobile unit 1 is inserted into the base station 20. As already explained, the accumulator 14 of the mobile unit 1 is charged in the state in which the mobile unit 1 is inserted into the base station 20. Furthermore, the control pad 23 of the base station 20 makes it possible to carry out the assignment of the freely assignable keys 11, 12 of the mobile unit 1. This means that assignment data which respectively assign connection destinations to the individual freely assignable keys 11, 12 are transmitted from the base station 20 to the mobile unit 1. As already stated, the assignment of the connection destination for the central key 7 cannot be changed by means of the base station 20 either.

The internal design of a mobile unit 1 will now be explained with reference to FIG. 4. The central component of the electronic system in a mobile unit 1 is, as illustrated, a processor 40 which may be, for example, a commercially available chip for mobile phones. Voice data, which are made available by means of a digitization, using an A/D converter 46, of the analogue voice signals which are input through the microphone 8, are supplied to the processor 40. The processor 40 is also supplied with the information from the dialling keys, namely the direct connection keys of the mobile unit 1. The supplying of signals by the central key 7 is illustrated as an example in FIG. 4. The key 7 is, as illustrated, connected to a timer 43. The timer 43 thus senses whether, and for how long, the key 7 is pressed. A counter 44, which is in turn connected to the timer 43, determines the period of activation of the key 7, which is sensed by the timer 43. The contents of the counter 44 are then supplied to the processor 40. Using the timer 43 and the counter 44, the processor 40 can thus sense whether a key, in the case illustrated the central key 7, is pressed and for how long a key has been pressed. The processor 40 can thus carry out an evaluation of a switched state. This means that the processor 40 can, for example, sense that the central key 7 of the mobile unit 1 is pressed for the first time in accordance with the embodiment in FIG. 1. The processor 40 implements this switched state 1 in such a way that it switches on the voltage supply for the mobile unit 1 and at the same time causes the mobile unit 1 to be signed on to the corresponding mobile radio network. Since the processor 40 also senses for how long the key 7 has been pressed during the first activation, it can, for example, cause an emergency call to be transmitted automatically to an emergency-call organization as connection destination when a predefined time period of activation of the key 7 has been exceeded.

Pressing the central key 7 again generates the switched state 2. This switched state 2 is evaluated by the processor 40 to the effect that it sets up the connection to the central switching device. The processor 40 thus evaluates the switched states and the time period of activation of the individual dialling keys of the mobile unit 1.

An RF module as transmitter/receiver unit is connected to the processor 40 in a known fashion, the antenna 2 of the mobile unit being in turn connected to said unit.

In a conventional mobile phone which has an address book function, when said function is activated address book data are usually loaded from a first dialling register, which can be stored, for example, on a chip card, into a second dialling register. However, according to the present invention the electronic system of a mobile unit 1 has only one dialling register 47 which contains the assignment data of the connection destinations for the freely assignable keys 11, 12 (see exemplary embodiment in FIG. 2). Therefore, when connection destinations are assigned to a freely assignable key using the central switching device or the base station 20 as mentioned above, the contents of the dialling register 47 alone are modified.

The function associated with operation of the central switching device will now be explained in more detail with reference to FIG. 5. FIG. 5 illustrates mobile units 1, 101, 201, 301 which can communicate with one another in particular via a central switching device 30. FIG. 5 illustrates the case in which the mobile unit 1 has set up a radio link 33 to the central switching device 30 by means of an antenna 31, and the central switching device 30 has transferred this call to a further mobile unit 201 on a further radio transmission path 34 by means of an antenna 32. The call transfer is carried out here as follows. For example, during the initial signing on of a mobile unit, a password table is created in the central switching device 30. Subscriber data, for example the call number or the chip card number (PIN number) etc., for passwords which are respectively assigned to the subscriber data are stored in the password table. If a mobile unit 1 has then set up a connection 33 to the central switching device 30 in the manner described above, for example using the central key 7, the subscriber data are automatically transmitted to the central switching device 30 simultaneously with the call, for example in the so-called A field of the GSM standard. As a result of the transmission of the subscriber data, the central switching device 30 is thus automatically and immediately provided, from the mobile unit 1, with information indicating which subscriber has set up a connection to the central switching device 30. After this automatic transmission of the subscriber data from the mobile unit 1 to the central switching device 30, the central switching unit 30 requests a password from the mobile unit 1. This password which is transferred by the mobile unit 1 in response to the request from the central switching device 30 is then compared in the password table in the central switching device 30. This means that the central switching unit 30 checks whether the transferred password is actually assigned to the automatically obtained subscriber data. Only if this checking of the password table is positive, i.e. if the transferred password and the transferred subscriber data actually correspond to the combination of password/subscriber data of the password table in the central switching device 30, does the central switching device 30 switch the call 33 from the mobile unit 1 to the desired subscriber, in the case illustrated to the mobile unit 201.

Even if a call is transferred to a further mobile unit in the example illustrated, it is still apparent that the call can equally well be transferred from a mobile unit according to the invention to a fixed network connection.

This security function provided by the requesting of the password is important because no PIN code has to be entered when the mobile unit 1 is switched on, so that this possibility of protection against theft or misuse is eliminated. Non-authorized persons can thus only receive calls with a mobile unit according to the invention. Outgoing calls can only be made to the connection destinations which, in the case of the embodiment in FIG. 2, are assigned to the freely assignable keys 11, 12. As a rule, these connection destinations which are assigned to the freely assignable keys 11, 12 are, however, only significant for a specific person, with the result that a fraudulent user will not have any interest in using these predefined connection destinations.

The card contained in a mobile unit is also in itself of little use to the fraudulent user since insertion of this card into another mobile unit will give rise to an authorization testing procedure which will end negatively.

Moreover, the password function is also used for the function of assigning the freely assignable keys 11, 12 in the embodiment of the mobile unit 1 according to FIG. 2 from the central switching device 30. After a call to the central switching device 30, a key assignment can therefore not take place until the password has been appropriately supplied. The switching operator in the central switching device 30 then transmits the corresponding instructions, for example DTMF instructions, to the calling mobile unit. In this way, for example on a mobile unit 1 which has been misappropriated, a fraudulent user cannot modify the connection destinations which have been assigned to the freely assignable keys 11, 12 by the legitimate user and which are meaningless to the fraudulent user, to enable him to use the central switching device 30 to assign connection destinations to the freely assignable keys 11, 12 which are more favourable for him, or more frequently desired by him.

In order to make the switching of an incoming call in a mobile unit in the central switching device 30 particularly fast and simple, when the mobile unit 1 is first signed on to the password table in the central switching device 30, it is possible, for example, to predefine preferred connection destinations whose number can be limited by the operator of the central switching device 30. Directly after a call by a mobile unit 1 and the automatic transmission of the corresponding subscriber data, the central switching device 30 thus determines the preferred connection destinations on the basis of the subscriber data of the corresponding password table, so that the call can be switched to the preferred connection destinations with much less effort than if a connection has to be made to any other desired connection destinations, which is of course also possible, with a comparatively larger search effort.

Therefore, according to the invention the key set can be severely reduced and nevertheless the complete operational capability of the mobile phone is ensured in that access to specific functions of the mobile unit are exported, for example, into an intelligent switching service or a base station, and therefore does not take place directly at the mobile unit.

What is claimed is:

1. In a mobile unit having one or more dialing keys, a method for configuring the mobile unit for a mobile radio transmission, said method comprising:

transmitting voice information from the mobile unit to a central switching center, wherein transmitted voice information represents a desired assignment of direct dialing keys of the dialing keys of the mobile unit;

assigning a connection destination to the direct dialing keys of the dialing keys of the mobile unit, based on the transmitted voice information, by using a wireless data transfer from the central switching center, whereby a connection destination assignment is established; and storing the connection destination assignment in a call number memory of the mobile unit.

2. The method for configuring a mobile unit for a mobile radio transmission, as claimed in claim 1, wherein the connection destination assignment cannot be modified by direct access to the mobile unit.

3. The method for configuring a mobile unit for a mobile radio transmission, as claimed in claim 1, further comprising designating one of the dialing keys as a central key and assigning a switching device as connection destination for the central key.

4. The method for configuring a mobile unit for a mobile radio transmission, as claimed in claim 1, further comprising assigning an emergency-call connection destination to one of the dialing keys.

5. In a mobile unit having one or more dialing keys, a method for configuring the mobile unit for a mobile radio transmission, said method comprising:

assigning a unique connection destination to each of the dialing keys of the mobile unit, wherein activating one of the dialing keys establishes the unique connection destination assigned to said one of the dialing keys;

inserting the mobile unit into a base station, wherein a data transmission from the base station to the mobile station carries out the unique connection destination assigning;

activating a central key to switch on the mobile unit;

activating the central key again to establish a connection to a central switching device;

releasing the connection by yet another activation of the central key, and switching off the mobile unit by a further activation of the central key.

6. The method for configuring a mobile unit for a mobile radio transmission, as claimed in claim 5, further comprising charging an accumulator in the mobile unit while the mobile unit is inserted in the base station.

7. The method for configuring a mobile unit for a mobile radio transmission, as claimed in claim 5, wherein the unique connection destination assigned cannot be modified by direct access to the mobile unit.

8. The method for configuring a mobile unit for a mobile radio transmission, as claimed in claim 5, further comprising designating one of the dialing keys as a central key and assigning a switching device as connection destination for the central key.

9. The method for configuring a mobile unit for a mobile radio transmission, as claimed in claim 5, further comprising assigning an emergency-call connection destination to one of the dialing keys.

10. A mobile radio transmission system having a mobile unit, which has direct connection keys and a central switching device, the system comprising:

the central switching device having a password table which contains subscriber data with a respectively assigned password;

means for transferring subscriber data and a password to the central switching device after a connection from the mobile unit to the central switching device has been established;

means for comparing the transferred subscriber data and password with the password table;

in the central switching device, means for assigning a connection destination to each one of the direct connection keys through means for transferring wireless data from the central switching center to the mobile unit, the assigning taking place in response to a corresponding transmission of voice information from the mobile unit to the central switching device; and a memory of the mobile unit for storing the transferred assignment.

11. The mobile radio transmission system, as claimed in claim 10, further comprising a base station into which the mobile unit can be inserted to carry out the assigning of said each one of the direct connection keys, except for a central key, by means for transmitting data from the base station to the mobile unit.

12. The mobile radio transmission system, as claimed in claim 11, further comprising:

the base station includes charging means;

the mobile unit includes an accumulator which can be charged while the mobile unit is inserted in the base station.

13. The mobile radio transmission system, as claimed in claim 11, wherein a list of possible connection destinations, each of which is assigned to a password and respective specific subscriber data, is provided in the password table of the central switching device.

* * * * *